US008307405B2

(12) United States Patent
Dow et al.

(10) Patent No.: US 8,307,405 B2
(45) Date of Patent: *Nov. 6, 2012

(54) METHODS, HARDWARE PRODUCTS, AND COMPUTER PROGRAM PRODUCTS FOR IMPLEMENTING ZERO-TRUST POLICY IN STORAGE REPORTS

(75) Inventors: Eli M. Dow, Poughkeepsie, NY (US); Marie R. Laser, Poughkeepsie, NY (US); Charulatha Dhuvar, Poughkeepsie, NY (US); Jessie Yu, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1171 days.

This patent is subject to a terminal disclaimer.

(21) Appl. No.: 12/110,593

(22) Filed: Apr. 28, 2008

(65) Prior Publication Data

US 2009/0271841 A1 Oct. 29, 2009

(51) Int. Cl.
*G06F 17/00* (2006.01)
*H04L 29/06* (2006.01)

(52) U.S. Cl. ............... 726/1; 711/6; 711/203; 718/104; 718/163

(58) Field of Classification Search .............. 711/6, 203; 718/104, 163; 726/1
See application file for complete search history.

(56) References Cited

U.S. PATENT DOCUMENTS

| 6,026,462 | A | 2/2000 | George et al. | |
|---|---|---|---|---|
| 6,735,666 | B1* | 5/2004 | Koning | 711/102 |
| 7,089,377 | B1 | 8/2006 | Chen | |
| 7,257,811 | B2 | 8/2007 | Hunt et al. | |
| 7,340,777 | B1* | 3/2008 | Szor | 726/26 |
| 7,814,287 | B2* | 10/2010 | Pratt | 711/163 |
| 2005/0086523 | A1 | 4/2005 | Zimmer et al. | |
| 2005/0160151 | A1* | 7/2005 | Rawson, III | 709/213 |
| 2006/0005189 | A1 | 1/2006 | Vega et al. | |
| 2006/0070065 | A1* | 3/2006 | Zimmer et al. | 718/1 |
| 2006/0294519 | A1* | 12/2006 | Hattori et al. | 718/1 |
| 2007/0006218 | A1 | 1/2007 | Vinberg et al. | |
| 2007/0050764 | A1 | 3/2007 | Traut | |
| 2007/0061441 | A1 | 3/2007 | Landis et al. | |
| 2007/0061492 | A1 | 3/2007 | van Riel | |
| 2007/0130366 | A1 | 6/2007 | O'Connell et al. | |
| 2007/0244972 | A1 | 10/2007 | Fan | |
| 2007/0266383 | A1 | 11/2007 | White | |
| 2007/0271559 | A1 | 11/2007 | Easton et al. | |
| 2008/0005297 | A1* | 1/2008 | Kjos et al. | 709/223 |
| 2008/0028124 | A1* | 1/2008 | Tago | 711/6 |

(Continued)

OTHER PUBLICATIONS

Pin Lu and Kai Shen, Virtual Machine Memory Access Tracing with Hypervisor Exclusive Cache, 2007, ACM and Department of CS, University of Rochester.*

(Continued)

*Primary Examiner* — Jeffrey Pwu
*Assistant Examiner* — Jayesh Jhaveri
(74) *Attorney, Agent, or Firm* — Cantor Colburn LLP; Steven Chiu

(57) ABSTRACT

A zero-trust policy is implemented in storage reports to provide a preventative measure against potential attack vectors. Introspection of a guest memory having a guest memory layout is performed. An operating system (OS) memory map is accepted. The guest memory layout is compared with the OS memory map. When the guest memory layout matches the OS memory map, the OS memory map is used to obtain one or more interested memory segments, and data processing is performed.

15 Claims, 3 Drawing Sheets

U.S. PATENT DOCUMENTS

| | | | | |
|---|---|---|---|---|
| 2008/0235793 | A1* | 9/2008 | Schunter et al. | 726/22 |
| 2008/0263658 | A1* | 10/2008 | Michael et al. | 726/22 |
| 2009/0063749 | A1 | 3/2009 | Dow | |
| 2009/0204964 | A1* | 8/2009 | Foley et al. | 718/1 |
| 2009/0241109 | A1* | 9/2009 | Vandegrift et al. | 718/1 |
| 2009/0300605 | A1* | 12/2009 | Edwards et al. | 718/1 |
| 2010/0017800 | A1 | 1/2010 | Dow et al. | |

OTHER PUBLICATIONS

U.S. Appl. No. 12/116,994, filed May 8, 2008; Non-Final Office Action mail date Jan. 20, 2012; 110pages.

B. Von Axelson; "Using Virtualization"; Microsoft, Windows server 2003; pp. 1-22.

"Cloud Computing: Benefits and Risks of Moving Federal IT into the Cloud", Testimony of Cita M. Furlani, Director, Information Technology Laboratory, National Institute of Standards and Technology, United States Department of Commerce, United States House of Representatives Committee on Oversight and Government Reform, Jul. 1, 2010.

IBM Redbooks; "IBM Information Infrastructure Solutions Handbook"; IP.com; Jun. 2010.

L. Van Doom, "Hardware Virtualization"; ETISS Lecture; Oct. 2007; pp. 1-55.

U.S. Appl. No. 12/116,994, Filing Date May 8, 2008; Final Office Action mail date Jun. 19, 2012; 31 pages.

* cited by examiner

US 8,307,405 B2

METHODS, HARDWARE PRODUCTS, AND COMPUTER PROGRAM PRODUCTS FOR IMPLEMENTING ZERO-TRUST POLICY IN STORAGE REPORTS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to workload management in a computing environment and, more particularly, to methods, devices, and computer program products for implementing a zero-trust policy in storage reports.

2. Description of Background

Many modem computing environments include load balancers or workload managers that monitor the resource consumption of a plurality of machines in a management pool. These resources include memory and storage devices that are accessed by one or more of the machines. In most cases, instrumentation is placed on one or more participating machines that are to be managed. If a participating machine is compromised, there exist potential attack vectors for all machines participating in the management pool. Moreover, a participating machine may report erroneous information indicating that the participating machine requires extensive resources whereas, in fact, the resource needs of the participating machine are relatively modest. Accordingly, what is needed is a technique for monitoring memory or storage utilization that does not rely upon information reported by a participating machine. A solution that addresses, at least in part, the above and other shortcomings is desired.

SUMMARY OF THE INVENTION

Embodiments of the invention include methods for implementing a zero-trust policy in storage reports. Introspection of a guest memory having a guest memory layout is performed. An operating system (OS) memory map is accepted. The guest memory layout is compared with the OS memory map. When the guest memory layout matches the OS memory map, the OS memory map is used to obtain one or more interested memory segments. Data processing is performed using an OS corresponding to the OS memory map and using the one or more interested memory segments.

Hardware products and computer program products corresponding to the above-summarized methods are also described and claimed herein. Other methods, hardware products, and computer program products according to embodiments will be or become apparent to one with skill in the art upon review of the following drawings and detailed description. It is intended that all such additional methods, hardware products, and computer program products be included within this description, be within the scope of the present invention, and be protected by the accompanying claims.

BRIEF DESCRIPTION OF THE DRAWINGS

Referring now to the drawings, wherein like elements are numbered alike in the several FIGURES.

The detailed description explains the preferred embodiments of the invention, together with advantages and features, by way of example with reference to the drawings.

DETAILED DESCRIPTION OF THE INVENTION

In the following description, details are set forth to provide an understanding of the invention. In some instances, certain software, circuits, structures and methods have not been described or shown in detail in order not to obscure the invention. The term "data processing system" is used herein to refer to any machine for processing data, including the client/server computer systems and network arrangements described herein. The present invention may be implemented in any computer programming language provided that the operating system of the data processing system provides the facilities that may support the requirements of the present invention. The invention may be implemented with software, firmware, or hardware, or any of various combinations thereof.

Figure 1:
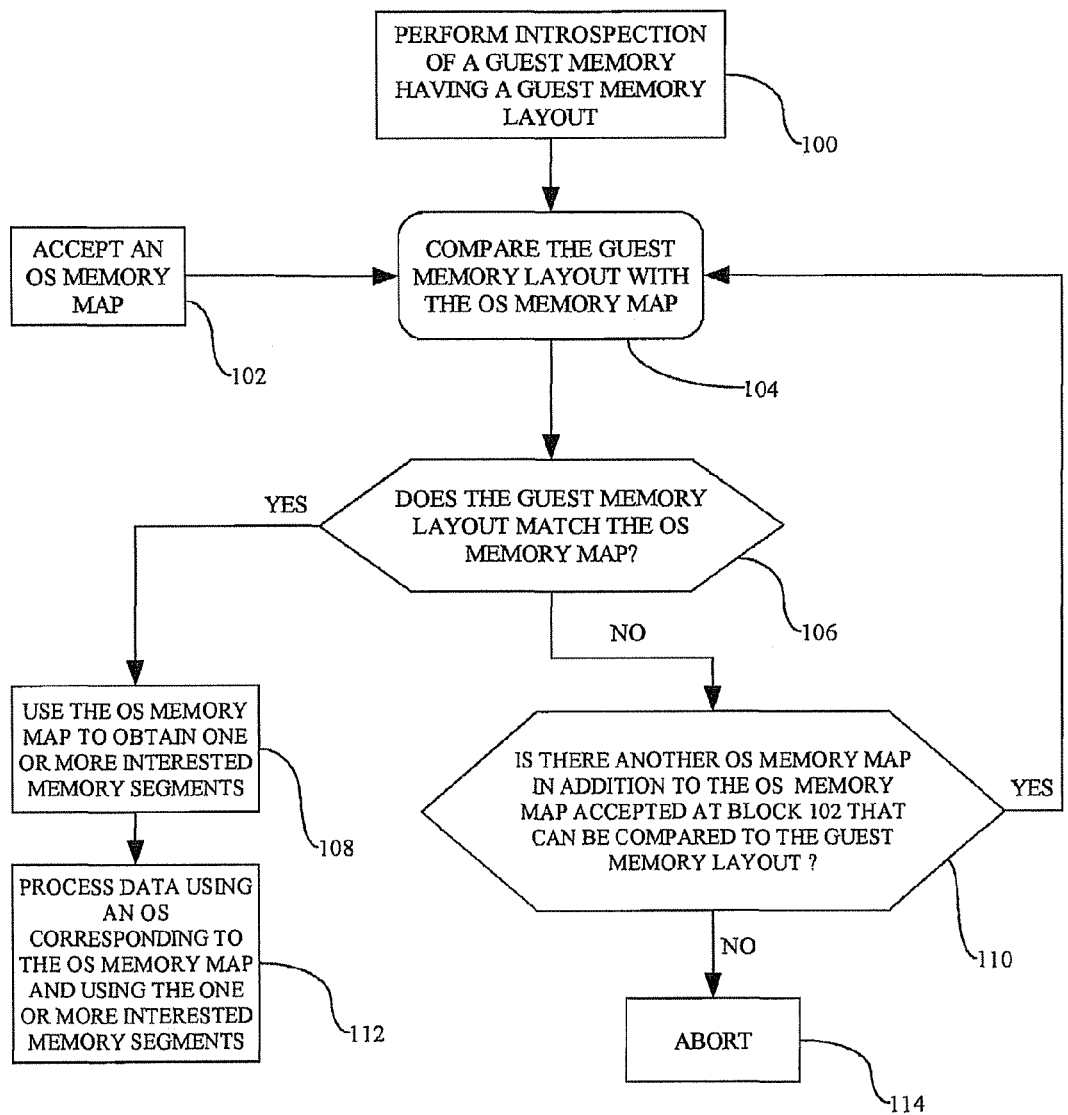
FIG. 1 is a flowchart setting forth an exemplary method for implementing a zero-trust policy in storage reports.

FIG. 1 is a flowchart setting forth an exemplary method for implementing a zero-trust policy in storage reports to provide a preventative measure against potential attack vectors. The operational sequence commences at block 100 or at block 102. Note that blocks 100 and 102 may be performed simultaneously, contemporaneously, or in any order. At block 100, introspection of a guest memory having a guest memory layout is performed. At block 102, an operating system (OS) memory map is accepted. Next, at block 104, the guest memory layout is compared with the OS memory map. A test is performed at block 106 to ascertain whether or not the guest memory layout matches the OS memory map. When the guest memory layout matches the OS memory map, the OS memory map is used to obtain one or more interested memory segments (block 108). Data processing is performed using an OS corresponding to the OS memory map and using the one or more interested memory segments (block 112).

If the test performed at block 106 indicates that the guest memory layout does not match the OS memory map accepted at block 102, a test is performed at block 110 to ascertain whether or not there is another OS memory map in addition to the OS memory map of block 102 that has been previously accepted, and that can be compared to the guest memory layout. The affirmative branch from block 110 leads back to block 104, whereas the negative branch from block 110 leads to block 114 where the procedure is aborted.

The procedure of FIG. 1 may, but need not, be performed by constructing one or more workload management components for each of a plurality of guest operating systems, such as a first guest operating system 211 (FIG. 2), a second guest operating system 212, and a third guest operating system 213, using a hypervisor 201 shim that requires no instrumentation on a participating pool member comprising any of the first, second, and third guest operating systems 211, 212, 213, respectively. In this manner, the workload management components are constructed to implement the zero trust policy. A hypervisor shim is leveraged underneath one or more participating OS's to be resource managed/monitored. At blocks 100-104, the hypervisor shim is used in conjunction with memory layout fingerprinting to examine a guest memory to identify an installed OS. Once the OS acting as a guest (which is to be monitored/managed) has been identified, a policy is then identified that specifies how to programmatically inspect one or more memory segments, such as memory pages, of that OS for statistical observation. For instance, we can determine if an OS is really using all the memory it claims to need, or if it is essentially being greedy by demanding more memory resources than it will be able to utilize. Optionally, components in addition to or in lieu of the workload management components may be constructed to implement the zero trust policy.

Figure 2:
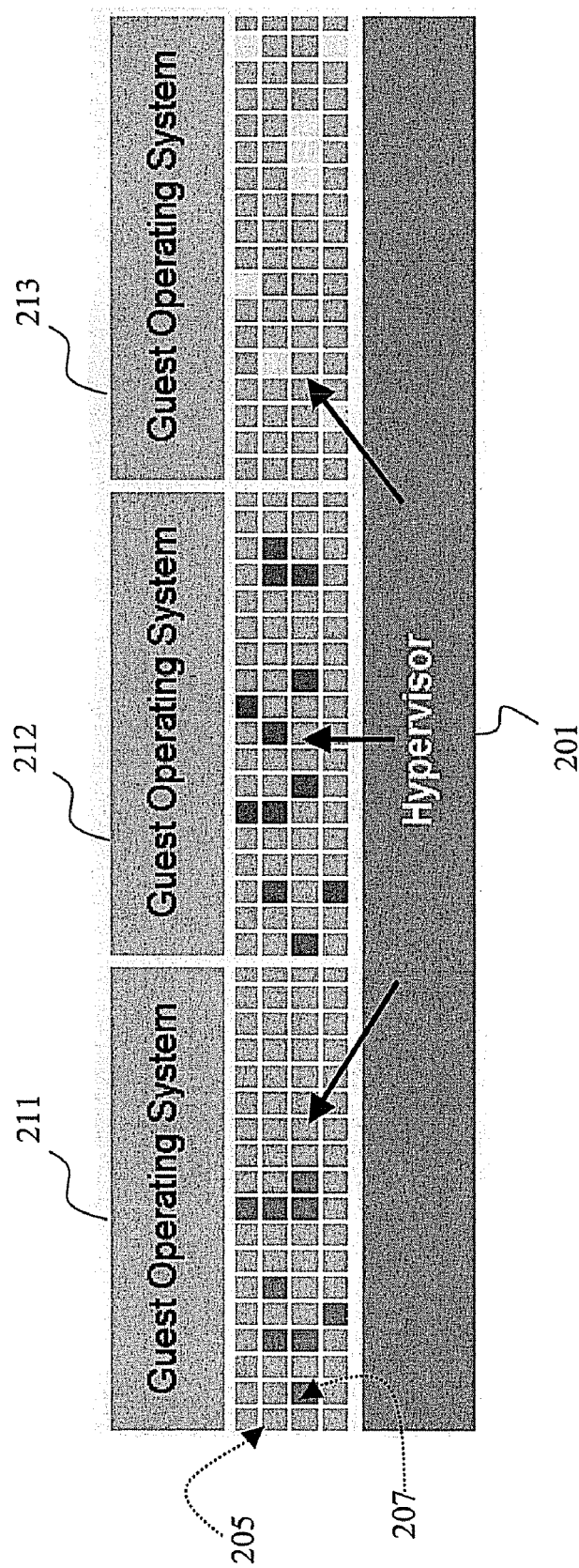
FIG. 2 is an architectural block diagram setting forth an illustrative operational environment in which the method of FIG. 1 may be performed.

FIG. 2 is an architectural block diagram setting forth an illustrative operational environment in which the method of FIG. 1 may be performed. A hypervisor 201 is operatively coupled to a first guest operating system 211, a second guest operating system 212, and a third guest operating system 213. The hypervisor 201, which may also be referred to as a virtualization manager, is a program that allows multiple OS's, which can include different OS's or multiple instances of the same OS, to share a single hardware processor. Illustratively, the hypervisor 201 is designed for a particular processor architecture, such as PowerPC architecture or Intel's x86 processor. Each OS, including the first guest operating system 211, the second guest operating system 212, and the third guest operating system 213, appears to have processor, memory, and other storage resources all to itself. However, the hypervisor 201 actually controls a processor and its resources, allocating what is needed to each operating system in turn, such as the first, second, or third guest operating system 211, 212, or 213, respectively.

Because an OS is often used to run a particular application or set of applications in a dedicated hardware server, use of the hypervisor 201 makes it possible to run multiple OS's (and their applications) in a single server, reducing overall hardware costs. Thus, a plurality of production and test systems can run at the same time in the same hardware. In addition, with the hypervisor 201, different operating systems such as Windows and Linux can share the same server.

Figure 3:
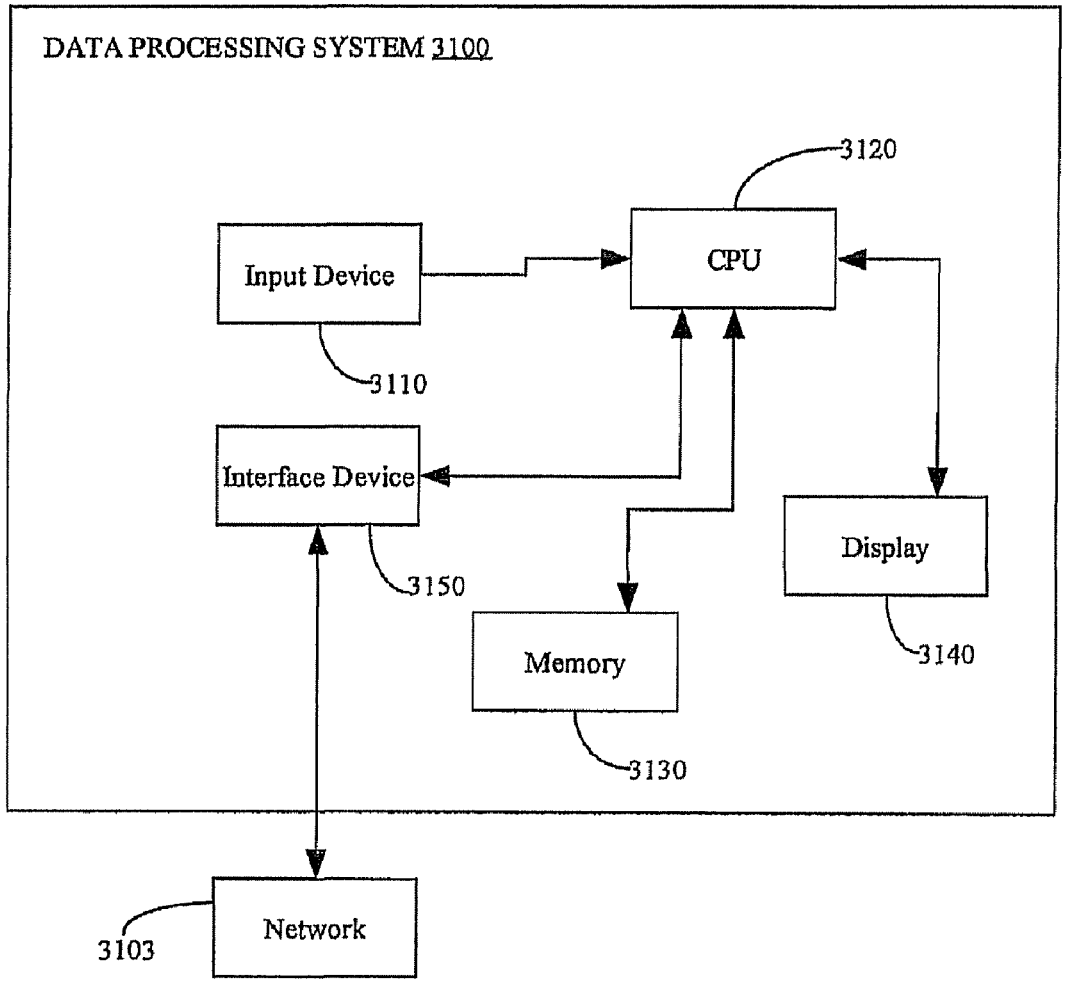
FIG. 3 is a block diagram setting forth an exemplary computer program product or hardware product for implementing a zero-trust policy in storage reports.

FIG. 3 is a block diagram setting forth an exemplary computer program product or hardware product for implementing a zero-trust policy in storage reports. It is to be clearly understood that FIG. 3 is illustrative in nature, as other systems, devices, or apparatuses not shown in FIG. 3 may also be used to implement embodiments of the invention. A data processing system 3100 includes an input device 3110, a central processing unit ("CPU") 3120, memory 3130, a display 3140, and an interface device 3150. The input device 3110 may include a keyboard, a mouse, a trackball, or a similar device. The CPU 3120 may include dedicated coprocessors and memory devices. The memory 3130 may include RAM, ROM, databases, or disk devices. The display 3140 may include a computer screen, terminal device, a hardcopy producing output device such as a printer or plotter, or a similar device. The interface device 3150 may include a connection or interface to a network 3103 such as the Internet, an intranet, a local area network (LAN), or a wide area network (WAN).

Optionally, the data processing system 3100 may be linked to other data processing systems over the network 3103. These other data processing systems may, but need not, include an application for implementing a zero-trust policy in storage reports. Of course, the data processing system 3100 may contain additional software and hardware, a description of which is not necessary for understanding the invention.

The data processing system 3100 has stored therein data representing sequences of instructions which, when executed, cause the methods described in connection with FIG. 1 to be performed. Thus, the data processing system 3100 includes computer executable programmed instructions for directing the system 3100 to implement any of the embodiments of the present invention. The programmed instructions may be embodied in at least one hardware, firmware, or software module 3170 resident in the memory 3130 of the data processing system 3100. Alternatively or additionally, the programmed instructions may be embodied on a computer readable medium (such as a CD disk, floppy disk, or USB-readable semiconductor storage device) which may be used for transporting the programmed instructions to the memory 3130 of the data processing system 3100. Alternatively or additionally, the programmed instructions may be embedded in a computer-readable, signal or signal-bearing medium that is uploaded to the network 3103 by a vendor or supplier of the programmed instructions, and this signal or signal-bearing medium may be downloaded through an interface 3150 to the data processing system 3100 from the network 3103 by end users or potential buyers.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for implementing a zero-trust policy in storage reports, the method comprising:
constructing one or more workload management components for each of a plurality of guest operating systems using a hypervisor shim that requires no instrumentation on a participating pool member comprising any of the plurality of guest operating systems, thus providing constructed workload management components for implementing the zero trust policy;
performing introspection of a guest memory having a guest memory layout;
accepting an operating system (OS) memory map;
comparing the guest memory layout with the OS memory map wherein, when the guest memory layout matches the OS memory map, the hypervisor shim uses the OS memory map to obtain one or more interested memory segments from the guest memory layout, wherein the one or more interested memory segments correspond to resource utilization; and using an OS corresponding to the OS memory map and using the one or more interested memory segments to perform data processing to monitor resource utilization.

2. The method of claim 1 wherein the one or more interested memory segments are obtained without relying upon information reported by the participating pool member.

3. The method of claim 1 wherein the hypervisor shim is leveraged underneath one or more participating OS's to be resource managed/monitored.

4. The method of claim 3 wherein the hypervisor shim is used in conjunction with memory layout fingerprinting to examine the guest memory layout to identify an installed OS.

5. The method of claim 4 wherein, once the installed OS has been identified, a policy is then identified that specifies how to programmatically inspect one or more memory segments comprising one or more memory pages of the installed OS for statistical observation.

6. A computer program product for implementing a zero-trust policy in storage reports, the computer program product including a tangible non-transitory storage medium readable by a processing circuit and storing instructions for execution by the processing circuit for facilitating a method including:
constructing one or more workload management components for each of a plurality of guest operating systems using a hypervisor shim that requires no instrumentation on a participating pool member comprising any of the plurality of guest operating systems, thus providing constructed workload management components for implementing the zero trust policy;
performing introspection of a guest memory having a guest memory layout;
accepting an operating system (OS) memory map;
comparing the guest memory layout with the OS memory map wherein, when the guest memory layout matches the OS memory map, the hypervisor shim uses the OS memory map to obtain one or more interested memory segments from the guest memory layout, wherein the one or more interested memory segments correspond to resource utilization; and
using an OS corresponding to the OS memory map and using the one or more interested memory segments to perform data processing to monitor resource utilization.

7. The computer program product of claim 6 wherein the one or more interested memory segments are obtained without relying upon information reported by the participating pool member.

8. The computer program product of claim 6 wherein the hypervisor shim is leveraged underneath one or more participating OS's to be resource managed/monitored.

9. The computer program product of claim 8 wherein the hypervisor shim is used in conjunction with memory layout fingerprinting to examine the guest memory layout to identify an installed OS.

10. The computer program product of claim 9 wherein, once the installed OS has been identified, a policy is then identified that specifies how to programmatically inspect one or more memory segments comprising one or more memory pages of the installed OS for statistical observation.

11. A hardware product for implementing a zero-trust policy in storage reports, the hardware product including a tangible non-transitory storage medium readable by a processing circuit and storing instructions for execution by the processing circuit for facilitating a method including:
constructing one or more workload management components for each of a plurality of guest operating systems using a hypervisor shim that requires no instrumentation on a participating pool member comprising any of the plurality of guest operating systems, thus providing constructed workload management components for implementing the zero trust policy;
performing introspection of a guest memory having a guest memory layout;
accepting an operating system (OS) memory map;
comparing the guest memory layout with the OS memory map wherein, when the guest memory layout matches the OS memory map, the hypervisor shim uses the OS memory map to obtain one or more interested memory segments from the guest memory layout, wherein the one or more interested memory segments correspond to resource utilization; and
using an OS corresponding to the OS memory map and using the one or more interested memory segments to perform data processing to monitor resource utilization.

12. The hardware product of claim 11 wherein the one or more interested memory segments are obtained without relying upon information reported by the participating pool member.

13. The hardware product of claim 11 wherein the hypervisor shim is leveraged underneath one or more participating OS's to be resource managed/monitored.

14. The hardware product of claim 13 wherein the hypervisor shim is used in conjunction with memory layout fingerprinting to examine the guest memory layout to identify an installed OS.

15. The hardware product of claim 14 wherein, once the installed OS has been identified, a policy is then identified that specifies how to programmatically inspect one or more memory segments comprising one or more memory pages of the installed OS for statistical observation.

* * * * *